UNITED STATES PATENT OFFICE.

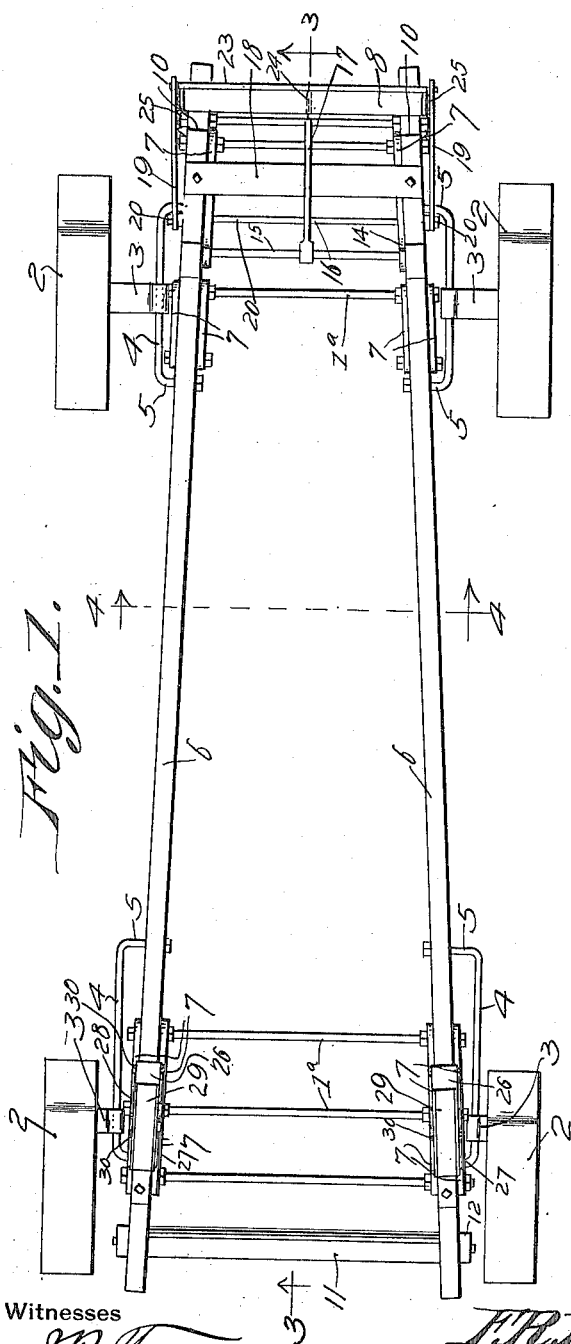

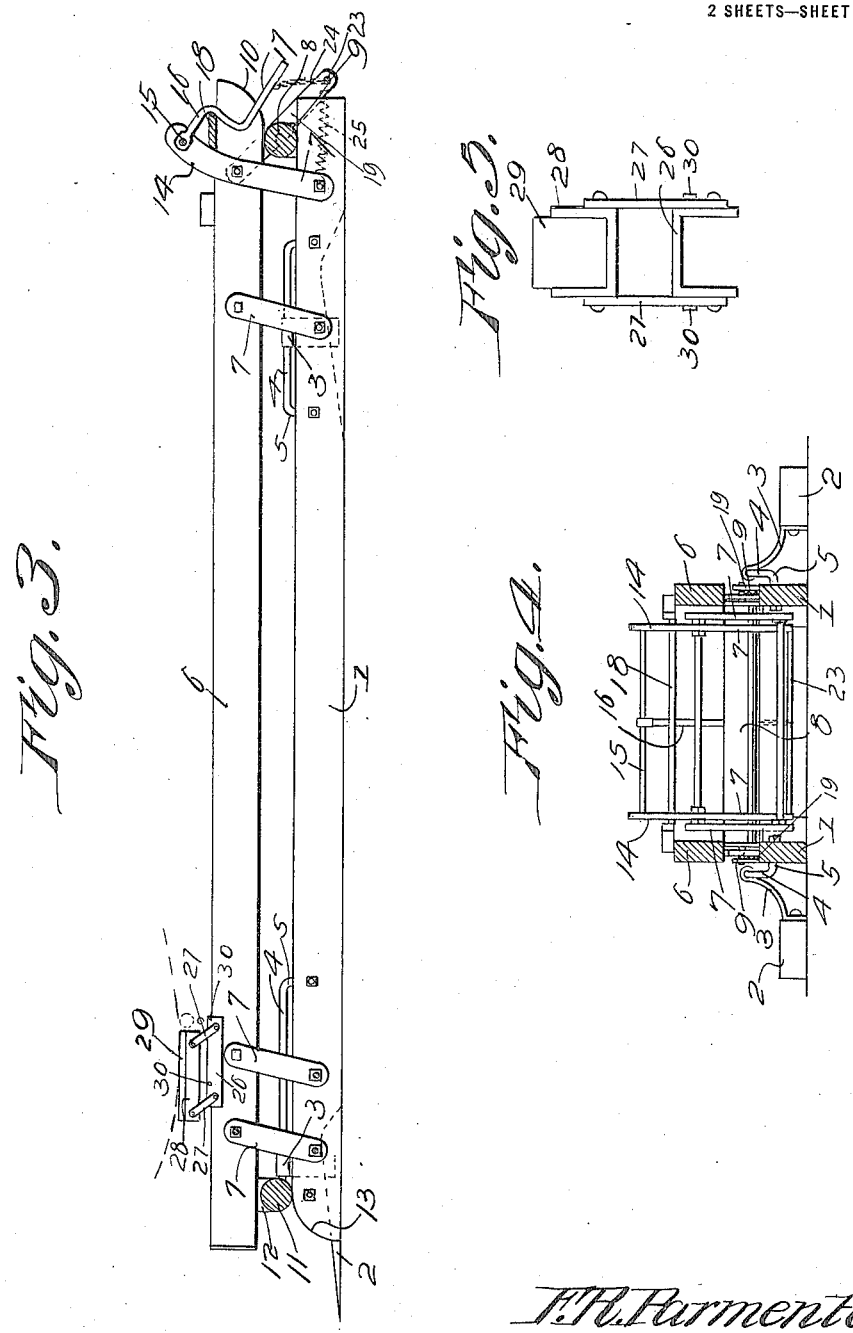

FRANK R. PARMENTER, OF LANSING, MICHIGAN.

AUTOMOBILE-JACK.

1,196,392.  Specification of Letters Patent.  Patented Aug. 29, 1916.

Application filed June 5, 1916. Serial No. 101,797.

*To all whom it may concern:*

Be it known that I, FRANK R. PARMENTER, a citizen of the United States, residing at Lansing, in the county of Ingham and State of Michigan, have invented a new and useful Automobile-Jack, of which the following is a specification.

The present invention appertains to automobile jacks, and aims to provide a novel and improved device for lifting and supporting an automobile which is run onto the same, whereby to relieve the tires of the weight of the car, although the present device can be used for lifting up or jacking the automobile for any other purpose.

It is the object of the invention to provide an automatic jack of the nature indicated, which is simple and inexpensive in construction, and which is so arranged that an automobile in being run over the jack will be automatically raised and held in supported position due to the momentum of the car when passing over the jack.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the jack. Fig. 2 is a side elevation thereof with the parts in position to receive the automobile. Fig. 3 is a longitudinal section taken on the line 3—3 of Fig. 1 showing the parts in the position which they occupy when supporting an automobile. Fig. 4 is a cross section taken on the line 4—4 of Fig. 1 showing the parts in the position seen in Fig. 3. Fig. 5 is an end view of one of the rear axles or rear spring supports In carrying out the invention, the structure includes a base comprising converging sills 1 connected by cross rods 1ª, said sills 1 being spaced slightly farther apart at their forward ends than at their rear ends. The sills 1 are set upon the floor of the garage or other place, and seated upon the floor at the opposite sides of the base and adjacent the ends thereof are inclines 2 formed of blocks. Said inclines 2 are provided at their inner edges with inwardly and upwardly projecting brackets 3 slidably engaging longitudinal guide rods 4 having their ends bent angularly inward and secured, as at 5, to the sills 1. The inclines 2 can thus be adjusted to different longitudinal positions, according to the various wheel bases of the automobiles for which the jack is adapted.

Disposed above and parallel with the sills 1 are lift bars 6 which may be constructed either of wood or of metal, the same as the sills 1. These bars 6 are mounted for upward movement, and for this purpose links 7 are pivotally engaged with the sills and bars, the lower ends of the links 7 being preferably engaged with the cross rods 1ª. When the bars 6 are moved forwardly, they seat upon the sills 1, and when said bars are moved rearwardly, they are elevated. Any suitable number of links 7 can be used.

A transverse roller 8 is terminally journaled to bearings 9 attached to the rear ends of the sills 1, and the rear ends of the bars 6 are curved, as at 10, whereby when the bars 6 are moved rearwardly, the rear ends 10 thereof engage and run onto the roller 8 to assist in guiding the rear ends of the bars 6 upwardly. When the bars 6 are raised, the rear portions thereof seat upon the roller 8.

A transverse roller 11 is terminally journaled to bearings 12 secured to the bars 6 adjacent the forward ends thereof, and the forward ends of the sills 1 are curved, as at 13, whereby when the bars 6 are raised, the roller 11 contacts with and runs upwardly upon the curved forward ends 13 of the sills 1. When the bars 6 are completely raised, the roller 11 seats upon the sills 1 to assist in supporting the forward ends of the bars 6.

As a means for automatically raising the bars 6 when the automobile is run over the jack, the links 7 at the rear end of the machine have upwardly projecting extensions 14 projecting above the bars 6 in the path of the front axle of the machine, whereby the front axle will strike the extensions 14 when the automobile is run onto the jack, so that the links 7 are swung rearwardly which will move the bars 6 rearwardly to elevate them. The bars 6 when raised will engage and lift the front axle.

A transverse rod 15 is terminally engaged with the extensions 14 and has mounted thereon between its ends an arm 16 having a downwardly offset handle 17 adapted to normally rest upon a cross bar 18 secured upon the bars 6 when the bars 6 are lowered. A pair of catches 19, formed from bars or other suitable stock, are pivotally mounted upon the terminals of a cross rod 20 which serves to pivot the rear links 7 to the bars 6, and said catches 19 have downwardly opening notches 21 between their ends. The catches 19 normally rest upon the terminals of the axle 22 of the roller 8, and when the bars 6 are moved rearwardly, the catches 19 are moved likewise, the notches 21 engaging the axle 2 when the bars 6 are raised, thereby to prevent the movement of the bars 6 in either direction, and to thereby hold them in raised position. The free rear ends of the catches 19 are connected by a cross rod 23 which is connected between its ends by a short chain or flexible element 24 with the handle 17, whereby when said handle is raised, the catches 19 will be raised to release the bars 6, and the handle can be swung to swing the links 7 forwardly, whereby the bars 6 will move forwardly and downwardly onto the sills 1. For this reason, the cross rod 15 is preferably rigid with the extensions 14, and the arm 16 is rigid with the cross rod. Coiled wire retractile springs 25 connect the cross rod 23 and the respective cross rod 1ª whereby to normally swing the catches 19 downwardly onto the axle 22.

Mounted upon the longitudinal bars 6 are adjustable supports for the rear axle or rear springs of the automobile. Said supports embody members 26 of channel-shape or U-shaped cross section which fit upon and straddle the upper edges of the bars 6 near the forward ends thereof, and the supports further include members 28 of the same shape as the members 26. The sides or flanges of said members 26 and 28 are connected by links 27, permitting of the longitudinal and vertical adjustment of the member 28. Blocks 29 of wood or other suitable material are fitted within the members 28 and preferably project therefrom for engagement with the rear axle or rear springs of the automobile. The members 28 can be held in various positions above the members 26 by any suitable means, and if desired, the members 26 can be provided with stops 30 against which the links 27 rest when the members 28 are raised. The members 26 can be adjusted longitudinally along the bars 6, for adjusting the supports for automobiles having different wheel bases, and the members 28 can be adjusted vertically to accommodate automobiles wherein the rear axles or rear springs are located at different heights above the ground.

In use, when the jack is in idle position, the bars 6 are moved forwardly and downwardly whereby the axles of the automobile can readily pass over the jack, and when the automobile moves to final position, the wheels thereof run upon the inclines 2, and the front axle strikes the extensions 14, thus raising the bars 6 whereby the front axle is raised thereby, while the rear axle or rear springs are raised by the blocks 29. This raises the tires from the floor and relieves them of the weight of the machine, whereby to prolong the lives thereof. The catches 19 in dropping into engagement with the axle 22, will hold the lift bars 6 in elevated position, and will prevent the movement of said bars in either direction. When it is desired to lower the automobile onto the floor, the handle 17 is raised, thus lifting the catches 19, and the handle in being swung will swing the extensions 14 forwardly, to thereby push the bars 6 to such a position that they can swing downwardly by gravity.

Having thus described the invention, what is claimed as new is:

1. An automobile jack embodying a pair of sills, a pair of lift bars, links connecting said bars and sills, inclines disposed at the opposite sides of the sills, longitudinal guide rods carried by the sills, and brackets carried by the inclines slidably engaging said rods.

2. An automobile jack comprising a pair of sills, a pair of lift bars, links connecting said bars and sills, a transverse roller carried by the sills adjacent one end, the ends of the bars adjacent said end of the sills being curved to ride onto said roller, and a transverse roller carried by the bars at that end thereof remote from the aforesaid roller, those ends of the sills adjacent the last mentioned roller being curved so that said roller can ride onto the same.

3. An automobile jack comprising a base, lift bars, links connecting said lift bars and base, the links adjacent one end of the base having upwardly projecting extensions, catches pivotally connected with said bars, the base having means for the engagement of said catches, a cross rod connecting said extensions, a handle secured to said cross rod, a cross rod connecting the free ends of the catches, and a connection between said handle and last mentioned cross rod whereby when the handle is raised, the catches are released and the extensions moved to lower the bars.

4. An automobile jack embodying a base, a pair of lift bars above the base movable upwardly and downwardly, channel-shaped members straddling and adjustable upon said bars, channel-shaped members above the aforesaid members, links connecting the flanges of said members, and cushion members fitted in the second mentioned channel-shaped members for supporting an automobile.

In testimony that I claim the foregoing as my own, I have hereto affixed my signature in the presence of two witnesses.

FRANK R. PARMENTER.

Witnesses:
V. E. LUNDY,
FRED HADLEY.

Copies of this patent may be obtained for five cents each, by addressing the "Commissioner of Patents, Washington, D. C."